(12) United States Patent
Weatherall

(10) Patent No.: US 7,040,593 B1
(45) Date of Patent: May 9, 2006

(54) UNIVERSAL ATTACHMENT UMBRELLA HOLDER

(76) Inventor: Darnell Weatherall, 44551 Stanridge Ave., Lancaster, CA (US) 93535

( * ) Notice: Subject to any disclaimer, the term of this patent is extended or adjusted under 35 U.S.C. 154(b) by 189 days.

(21) Appl. No.: 10/746,066

(22) Filed: Dec. 24, 2003

Related U.S. Application Data

(60) Provisional application No. 60/436,504, filed on Dec. 26, 2002.

(51) Int. Cl.
F16M 13/00 (2006.01)

(52) U.S. Cl. .................. 248/514; 248/541; 248/188.2; 135/15.1

(58) Field of Classification Search ................ 248/514, 248/511, 157, 158, 161, 162.1, 168, 125.8, 248/127, 176.1, 188.2, 188.5, 519, 521, 523, 248/528, 529, 536, 539, 541; 135/15.1
See application file for complete search history.

(56) References Cited

U.S. PATENT DOCUMENTS

| | | | | |
|---|---|---|---|---|
| 122,370 A | * | 1/1872 | Doolittle | 248/515 |
| 4,602,781 A | * | 7/1986 | La Marsh et al. | 482/58 |
| 4,887,786 A | * | 12/1989 | Stokes | 248/512 |
| 5,033,223 A | * | 7/1991 | Minter | 43/21.2 |
| 5,172,885 A | | 12/1992 | Kreischer | |
| 5,505,413 A | * | 4/1996 | Hennessey | 248/166 |
| 5,518,218 A | | 5/1996 | Leonard | |
| 5,836,327 A | * | 11/1998 | Davis | 135/16 |
| 5,937,881 A | | 8/1999 | Villa | |
| 6,113,054 A | * | 9/2000 | Ma | 248/523 |
| 6,435,469 B1 | * | 8/2002 | Ratcliff et al. | 248/535 |
| 6,585,199 B1 | * | 7/2003 | Yu | 248/166 |

* cited by examiner

Primary Examiner—Robert P. Olszewski
Assistant Examiner—Todd M. Epps

(57) ABSTRACT

A universal attachment umbrella holder for providing a portable umbrella holder that can be attached to various objects. The universal attachment umbrella holder includes an adjustable base assembly having a pair of support arms and a clamping arm to permit clamping of the base assembly to an object or positioning on a support surface. A holding assembly is provided for receiving and supporting the post of an umbrella. In an embodiment, a holding tube is used for insertion into the post of the umbrella while the post is further held by a holding cup that surrounds the post.

20 Claims, 9 Drawing Sheets

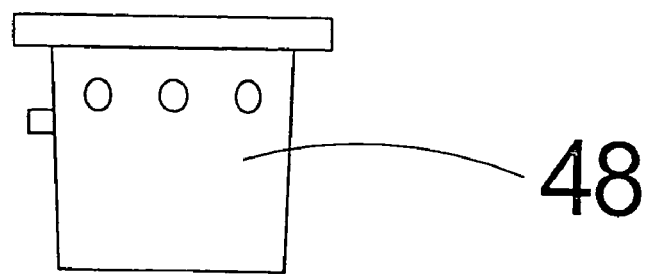
Fig. 6
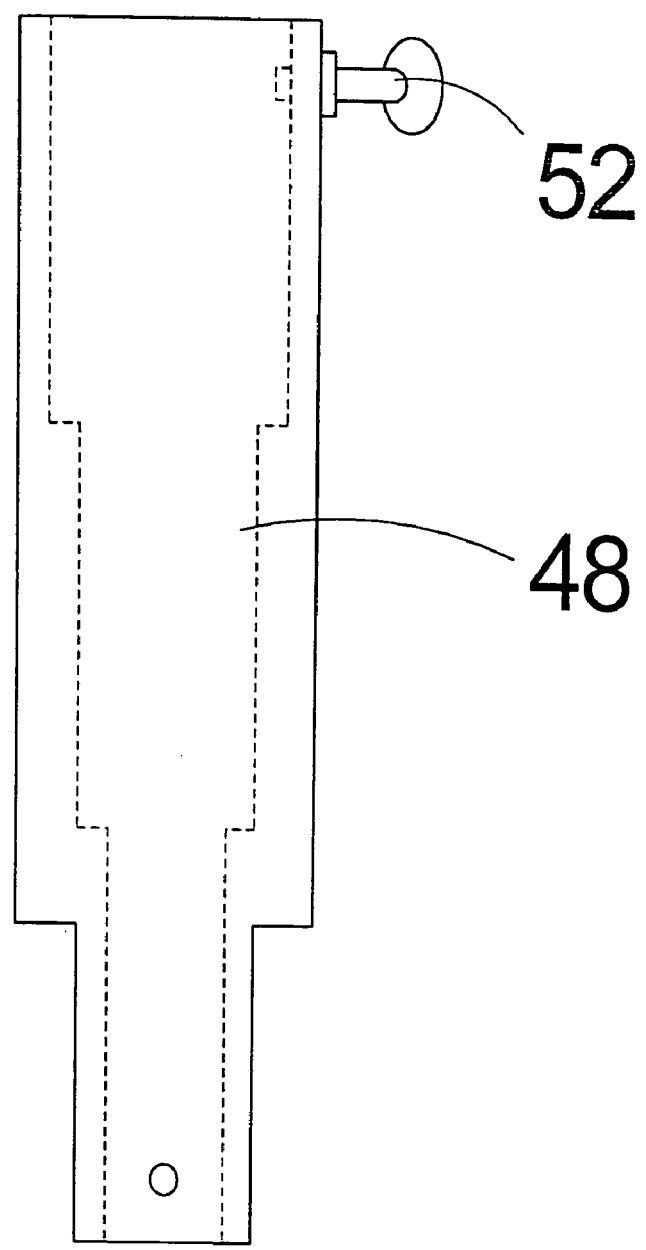

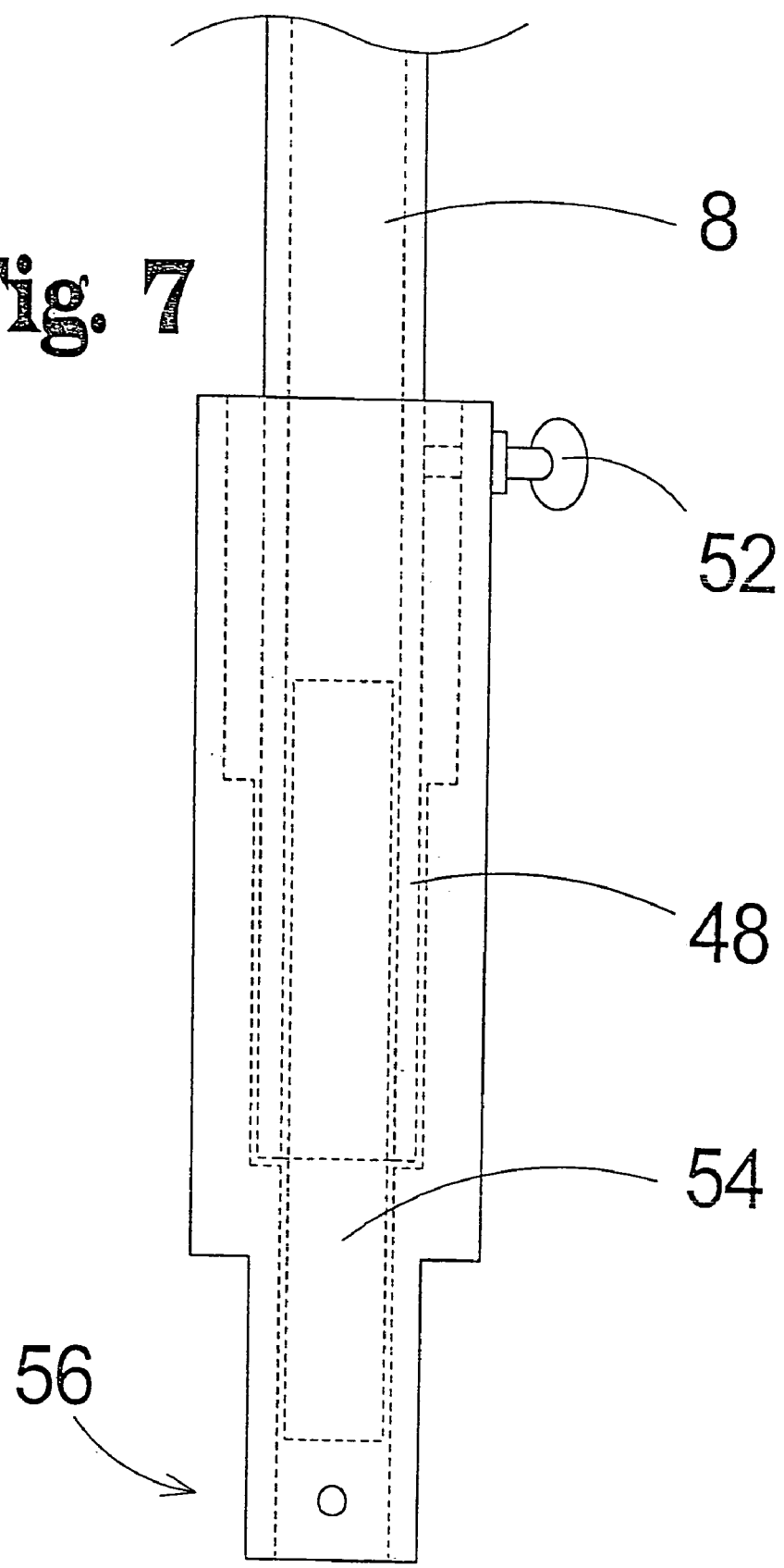

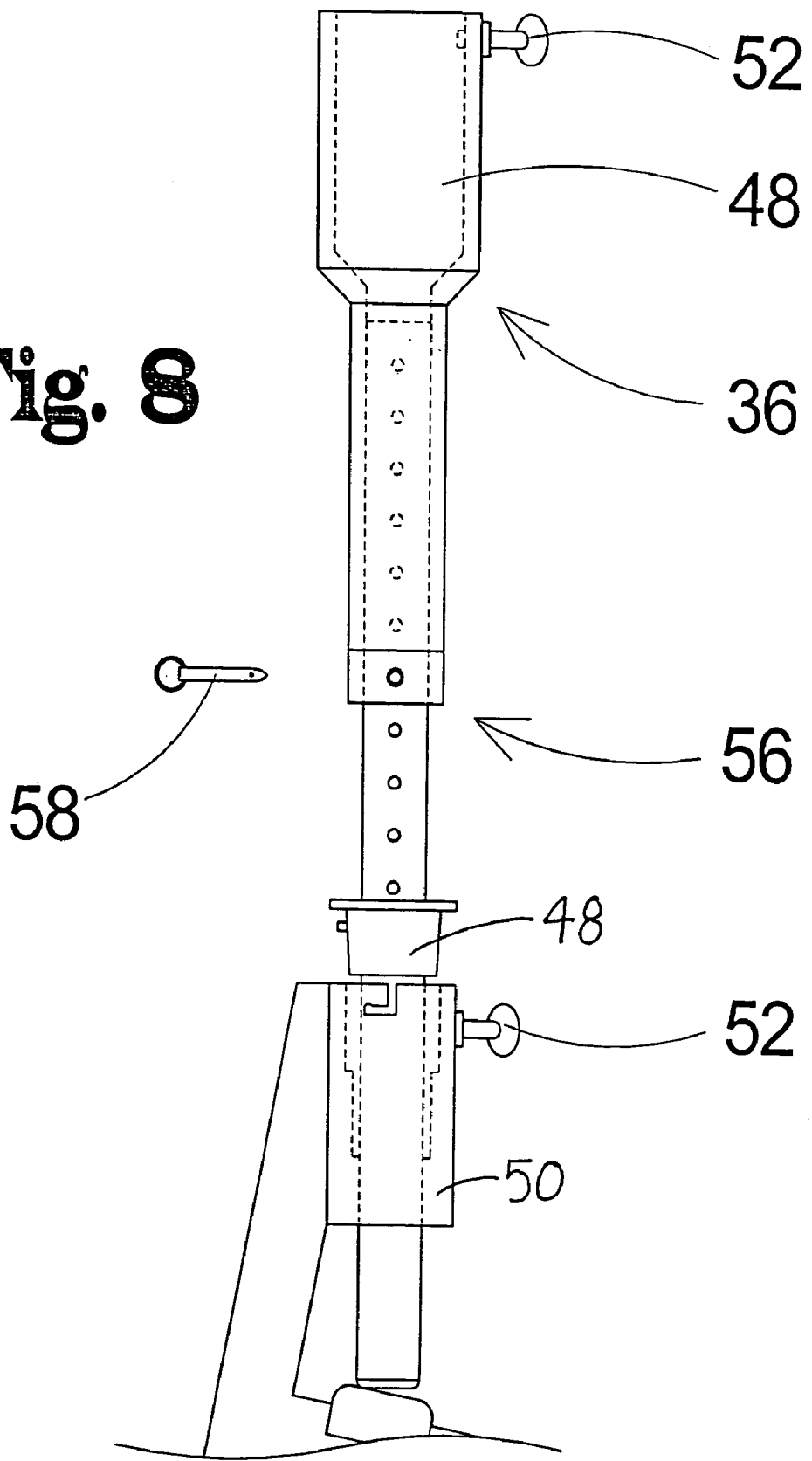

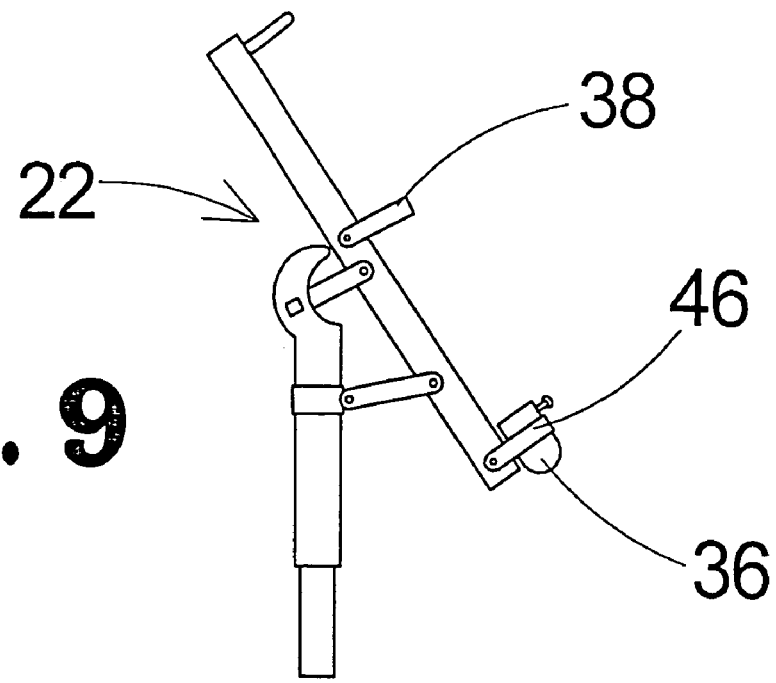
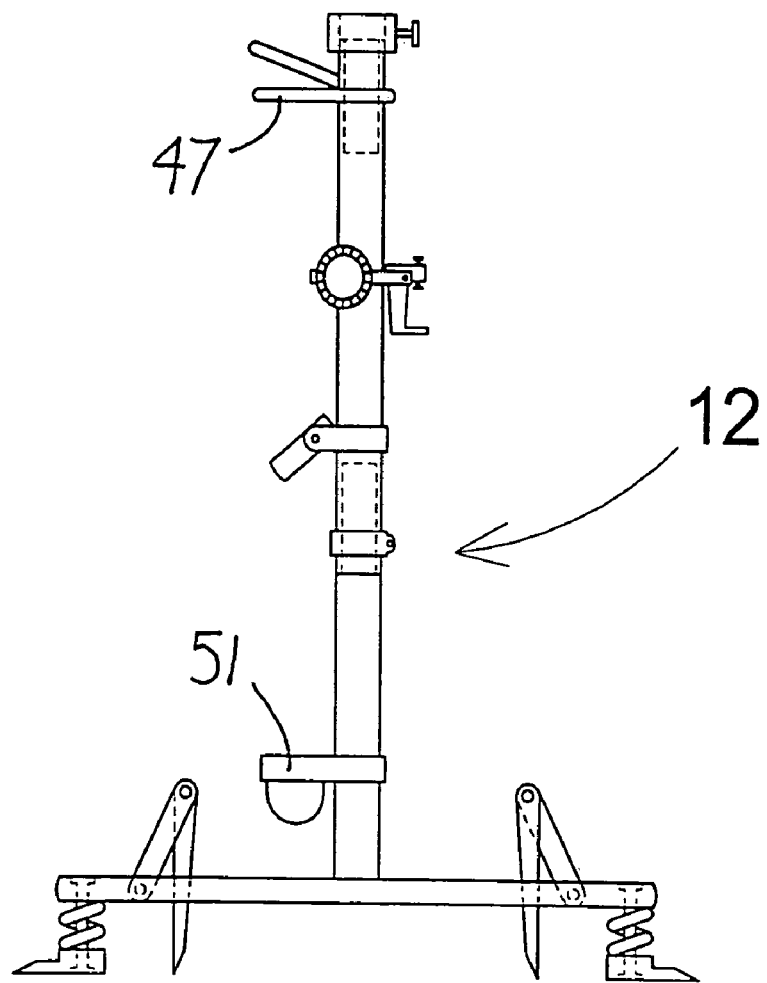

UNIVERSAL ATTACHMENT UMBRELLA HOLDER

CROSS-REFERENCE TO RELATED APPLICATION

This application claims the benefit of U.S. Provisional Application No. 60/436,504, filed Dec. 26, 2002.

BACKGROUND OF THE INVENTION

1. Field of the Invention

The present invention relates to umbrella holders and more particularly pertains to a new universal attachment umbrella holder for providing a portable umbrella holder that can be attached to various objects.

2. Description of the Prior Art

The use of umbrella holders is known in the prior art. U.S. Pat. No. 5,172,885 issued to Kreischer on Dec. 22, 1992 describes a device for mounting an umbrella on a variety of wire baskets. Another type of umbrella holder is U.S. Pat. No. 5,518,218 issued to Leonard on May 21, 1996 showing a long tube for bungee cord attachment to a structure or insertion into the ground. U.S. Pat. No. 5,937,881 issued to Villa on Aug. 17, 1999 discloses a shadow casting umbrella stand structure that extends up from a base and supports a hanging canopy.

While these devices fulfill their respective, particular objectives and requirements, the need remains for a device that can alternately provide a stand or be clamped to an existing structure to hold and support an existing umbrella.

SUMMARY OF THE INVENTION

The present invention generally comprises a base assembly having a pair of support arms and a clamping arm. The support arms and clamping arm work together to permit use of the base assembly as a stand or to clamp the base assembly to a support structure. A holding assembly is attached to the base assembly to provide pivoting and tilting of an umbrella inserted into the holding assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a front view of an alternative holding cup structure of the present invention.

FIG. 7 is a front view of an alternative holding cup of the present invention.

FIG. 8 is a side view of an alternative holding cup structure for providing height adjustment.

FIG. 9 is an exploded view of an alternate embodiment of the present invention.

DESCRIPTION OF THE PREFERRED EMBODIMENT

Figure 1:
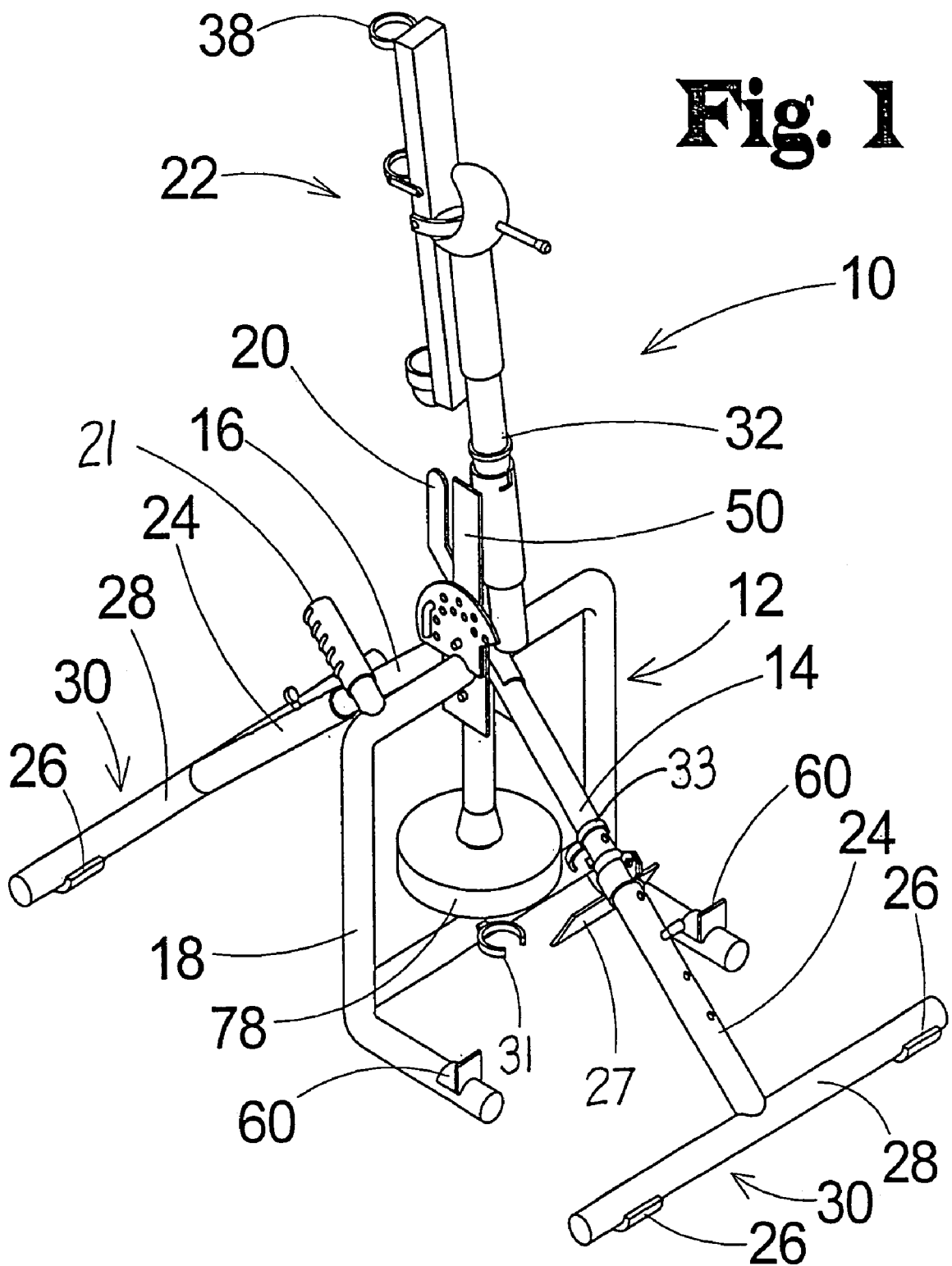
FIG. 1 is a perspective view of a new universal attachment umbrella holder according to the present invention.
Figure 2:
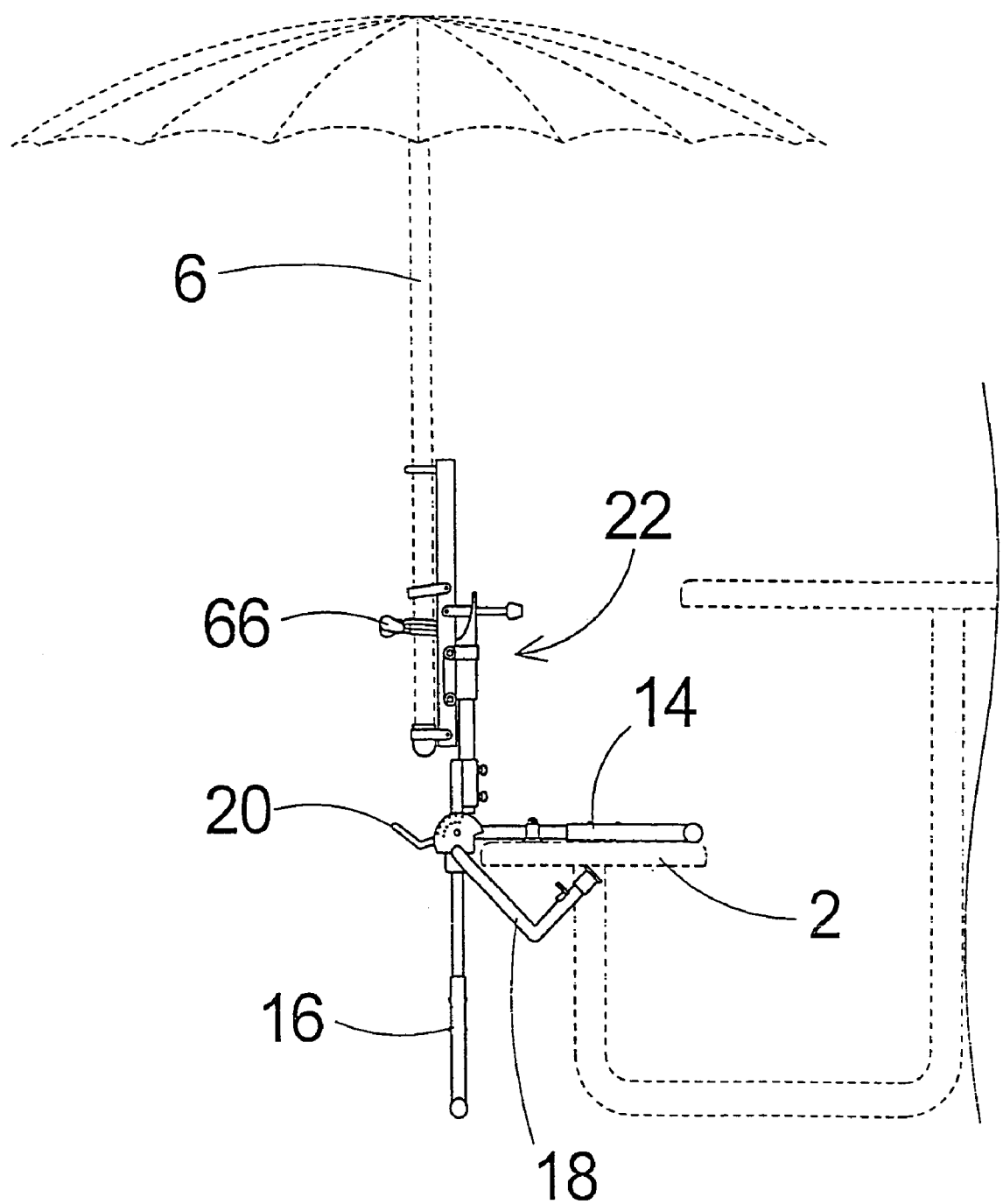
FIG. 2 is a side view of the present invention showing attachment to a bench seat.

With reference now to the drawings, and in particular to FIGS. 1 through 9 thereof, a new universal attachment umbrella holder embodying the principles and concepts of the present invention and generally designated by the reference numeral 10 will be described.

As best illustrated in FIGS. 1 through 9, the universal attachment umbrella holder 10 generally comprises a base assembly 12 having a pair of support arms 14, 16 and a clamping arm 18. In an embodiment, each of the support arms 14, 16 is pivotally coupled to be positionable at an adjustable angle relative to each other. Alternatively, the support arms 14, 16 may be integral and form a fixed angle relative to each other. The clamping arm 18 is pivotable relative to the support arms 14, 16. Thus, the clamping arm 18 is designed to clamp an object 2 between the clamping arm 18 and one of the support arms either 14 or 16 as desired. A tightening member 20 is provided for tightening the support arms 14, 16 and the clamping arm 18 to hold the support arms 14, 16 and clamping arm 18 in place in a desired position. Further, a handle 21 may be mounted on the clamping arm 18 to facilitate holding of the clamping arm 18 in position during, for example, adjustment of the various adjustable parts of the invention.

A holding assembly 22 is pivotally coupled to the base assembly 12 so that the orientation of the holding assembly may be adjusted with respect to the base assembly 12. Thus, the invention is designed for holding an umbrella 4 at a desired angle with respect to the base assembly 12, and any structure or surface on which the base assembly 12 is supported.

Each support arm 14, 16 may include a telescopic and generally T-shaped end portion 24. Optionally, an end of each of the T-shaped end portions 24 may be inserted into a portion of the respective support arm 14, 16, or the end of each of the T-shaped end portions 24 may receive a portion of the respective support arm 14, 16. Additionally, a plurality of rubber pads 26 may be attached along an outer flange 28 of the T-shaped end portions 24. As a further option, the outer flange 28 of each T-shaped end portion 24 may also be adjustable by telescoping or folding to facilitate compact storage and portability.

Figure 3:
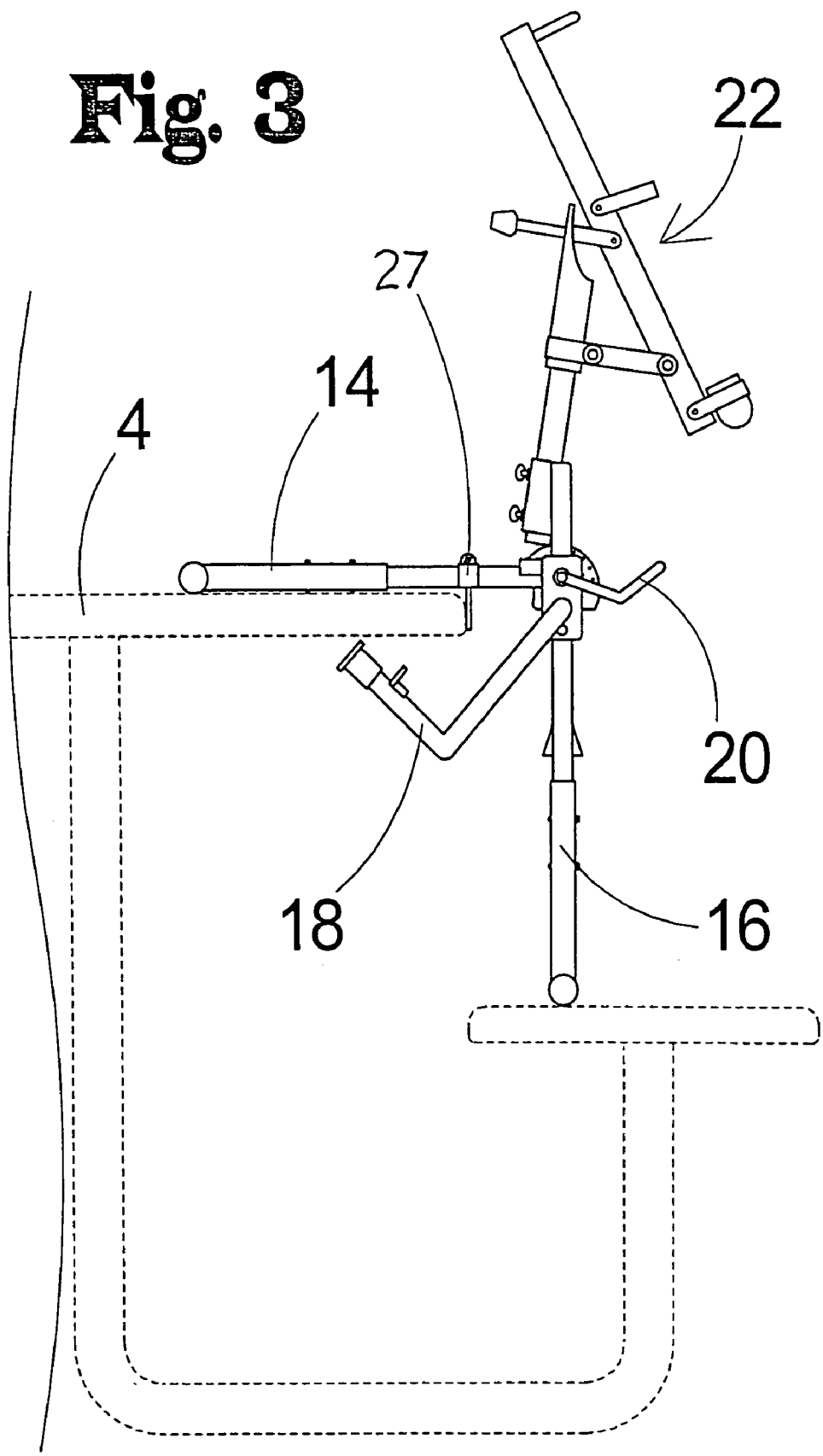
FIG. 3 is a side view of the present invention attached to a horizontal board, particularly a picnic table top.
Figure 4:
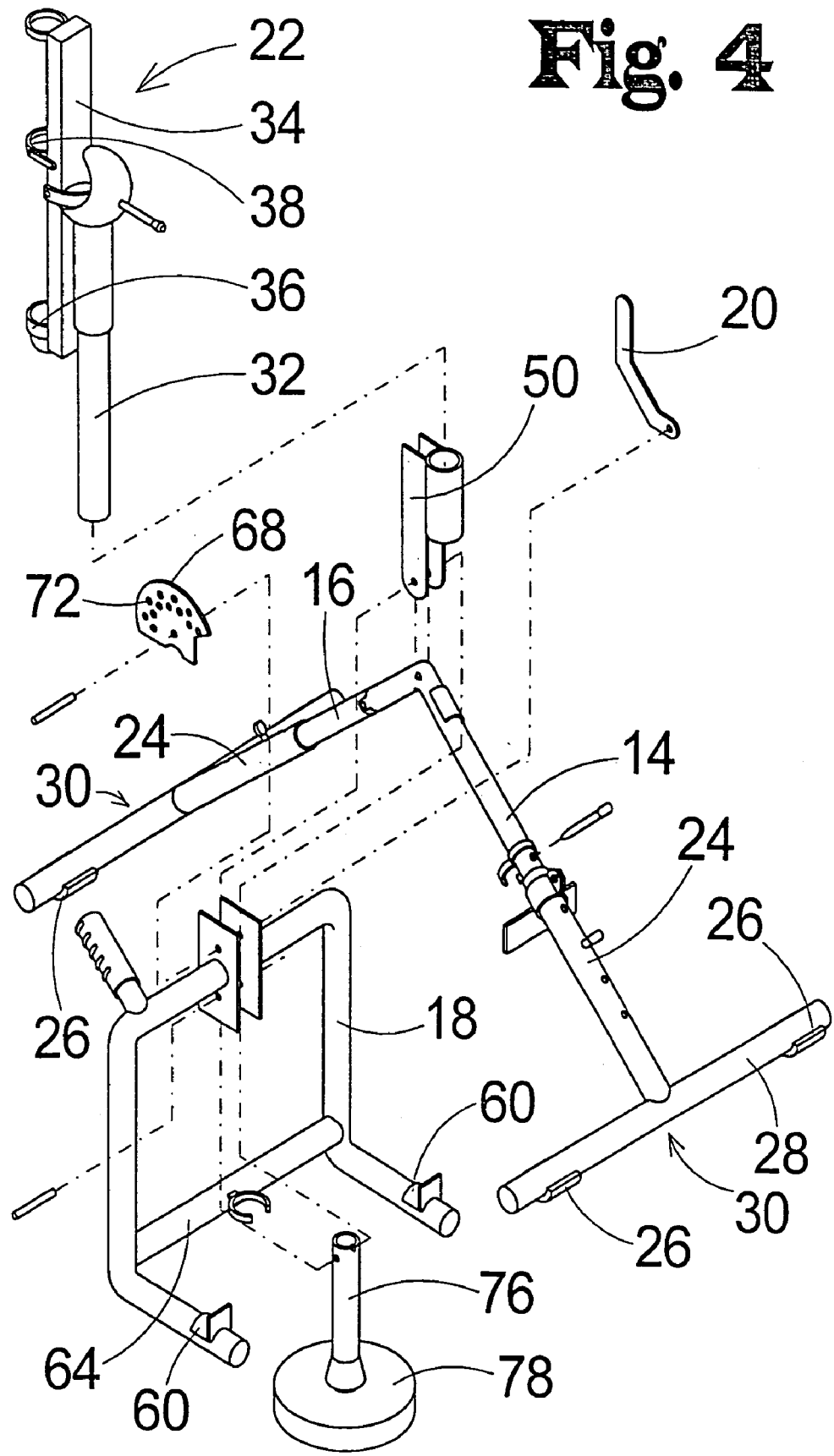
FIG. 4 is an exploded view of the present invention.
Figure 5:
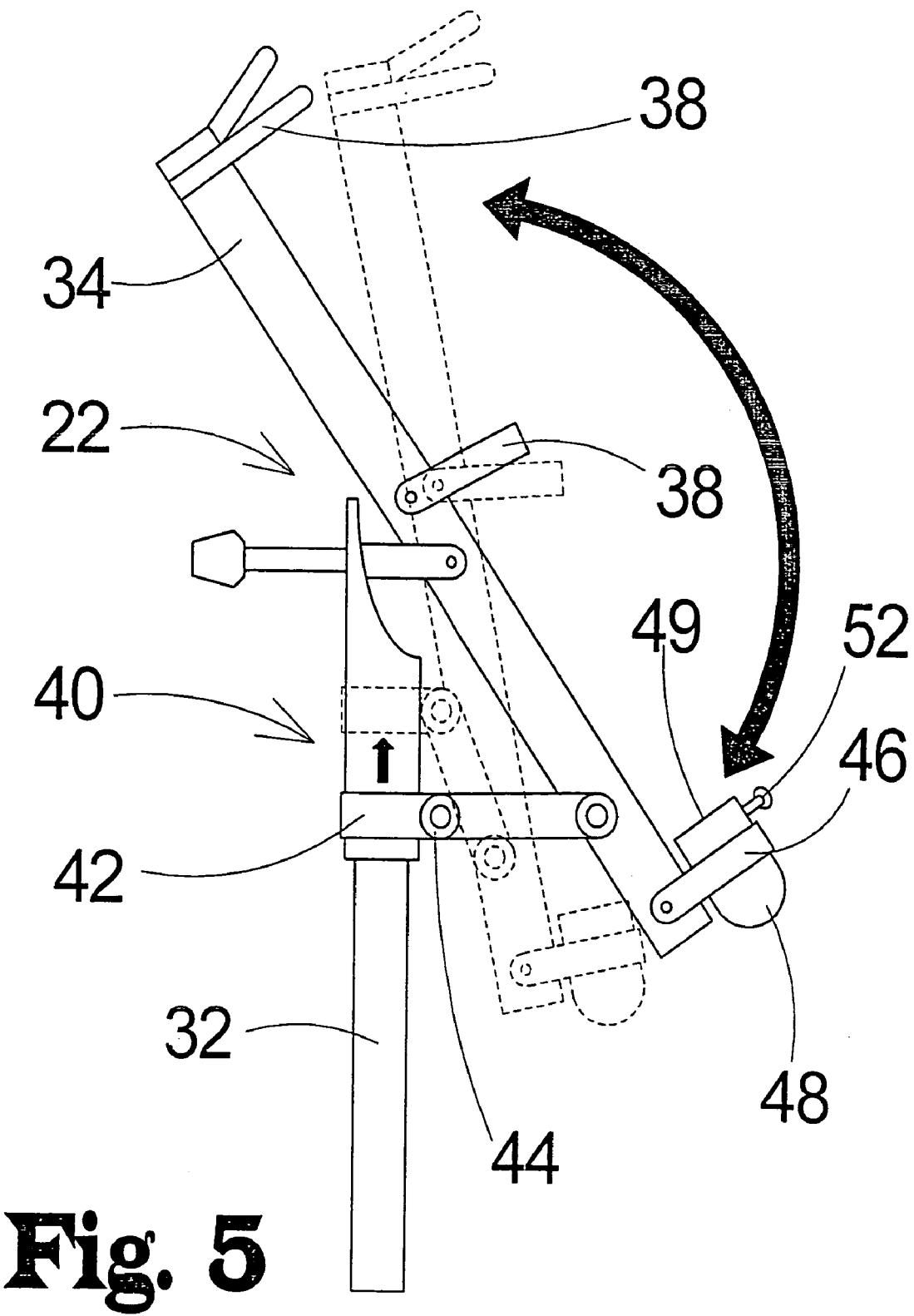
FIG. 5 is an enlarged view of the holding cup assembly of the present invention.

The base assembly 12 may also include a stabilizer 27 that is mounted on one of the T-shaped end portions 24 or on one of the support arms 14, 16). The stabilizer 27 may include a plate portion that extends away from the end portion 24 or the support arm 14, 16 in a substantially perpendicular orientation to the longitudinal axis of the support arm, and is especially suitable for resting against an edge surface of a table when the invention is mounted on a table as shown in FIG. 3 of the drawings. The stabilizer 27 may also include a clamp portion that is selectively loosenable to permit adjustment of the position of the stabilizer 27 along the end portion 24 or the support arm 14, 16 and is also selectively tightenable to permit locking of the position of the stabilizer 27 relative to the support arm 14, 16 or the end portion 24, such as when the stabilizer 27 has been adjusted to abut against the edge of the table.

Optionally, distal ends 30 of the support arms 14, 16 and clamping arm 18 are positionable in a plane to facilitate stable positioning of the base assembly 12 directly on a planar surface such as the surface of the ground. Further, the base assembly 12 may also include first 31 and second 33 clips mounted on the support arms 14, 16 and cross members of the clamping arm 18 to permit various tubes of the invention to be temporarily connected to these portions.

In greater detail, the holding assembly 22 of the invention has a first post 32 and a second post 34. The first post 32 is coupled to the base assembly 12 and the second post 34 is pivotally coupled to the first post 32. A base support 36 and at least one loop 38 are coupled to the second post 34 such that an umbrella pole 6 is insertable through the loop 38 and supported by the base support 36 such that the umbrella pole 6 is positioned to extend parallel to the second post 34. The base support 36 is formed by a connection band 46 coupled to the second post 44 and a holding cup 48 having a lip 49 that is supported by the connection band 46 when the holding cup 48 is inserted through the connection band 46.

A sliding collar assembly 40 extends from the second post 34 and engages the first post 32 to allow the second post 34 to be tilted relative to the first post 32 by sliding a collar portion 42 on the first post 32. The collar portion 42 frictionally engages the first post 32 for holding the first and second posts 32, 34 in a static position relative to each other until sufficient force is applied to move the collar portion 42 on the first post 32. An adjustment knob 44 is operationally coupled to the collar portion 42 for selectively tightening the collar portion 42 around the first post 32 to inhibit sliding of the collar portion 42 on the first post 32.

The base assembly 12 includes a position adjustment piece 50 that pivots relative to the support arms 14, 16 and the clamping arm 18. The first post 32 of the holding assembly 22 is inserted into the position adjustment piece 50.

In various embodiments, a plurality of variously sized holding cups 48 to accommodate variously sized umbrellas. Thumb screws 52 are provided for coupling the holding cups 48 to the connection band 46. Additionally, an optional holding tube 54 is anchorable in the holding cup 48 such that the holding tube 54 is insertable into a tubular umbrella post 8 when the tubular umbrella post 8 is inserted into the holding cup 48.

The holding cup 48 may also be generally tubular so that, if desired, the holding cup 48 may be inserted directly into the position adjustment piece 50. The holding cup 48 may also include a telescopic neck portion 56 secured by locking pins 58.

In an embodiment, hooks 60 extend from the clamping arm 18 to facilitate stable positioning and clamping of the clamping arm 18.

A movable support arm pad assembly 62 is positionable along a length of a selectable one of the support arms 14, 16 to facilitate clamping using the support arm 14 or 16. A clamping arm pad 64 is positionable along the clamping arm 18 to facilitate clamping and prevent damage by the clamping arm 18.

A butterfly clip 66 is couplable to the umbrella pole between the holding cup 48 and the loop 38. The butterfly clip 66 is positionable adjacent to the loop 38 whereby the umbrella pole is inhibited from being removed from the holding cup 48.

A plate 68 is coupled to a pivot point 70 of the support arms 14, 16 and clamping arm 18. The plate 68 has a plurality of apertures 72. A catch pin 74 is insertable through a selectable one of the apertures 72 in the plate 68 such that the catch pin 74 restricts movement of the support arms 14, 16 and clamping arm 18 if desired.

The base assembly 12 is sufficiently weighted through the inherent weight of the previously described structure. However, a pivoting weight arm 76 is coupled to the base assembly 12 to permit additional weighting of the base assembly 12 as desired. A weight member 78 is selectively couplable to the weight arm 76 for inhibiting tipping of the base assembly during use. The pivoting of the weight arm 76 helps to inhibit tipping due to the weight arm 76 and weight member 78.

Thumb screws may also be used to anchor the umbrella post in the holding cup 48. Optionally, holding cup 48 may be provided with a nub (shown in FIG. 8) that may be removably receivable in a slot formed in the position adjustment piece 50 of the invention. The slot may be generally L-shaped so that the holding cup is secured against removal with a portion of the invention that is inserted into the holding cup.

In an embodiment of the invention, spring biased feet may be used and ground spikes may be insertable through the support arms to secure the base assembly.

The base assembly 12 of the invention may also include an auxiliary connection band 47 and an auxiliary holding cup 51 for holding the umbrella in a relatively stationary position with respect to the base assembly 12 and the surface on which the base assembly is supported.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An umbrella holder assembly comprising:
    a base assembly having a pair of support arms and a clamping arm;
    the support arms being pivotally coupled to the clamping arm for being adjustably positionable relative to the clamping arm;
    the clamping arm being pivotable whereby the clamping arm is adapted to clamp an object between the clamping arm and one of the support arms;
    a tightening member for tightening the support arms and the clamping arm to hold the support arms and clamping arm in place in a desired position;
    a holding assembly being pivotally coupled to the base assembly whereby the base assembly is adapted for holding an umbrella at a desired angle.

2. The umbrella holder assembly of claim 1 wherein each support arm includes a telescopic generally T-shaped end portion.

3. The umbrella holder assembly of claim 2, further comprising:
   a plurality of rubber pads attached along an outer flange of the T-shaped end portions.

4. The umbrella holder assembly of claim 2 wherein an outer flange of each T-shaped end portion is adjustable to facilitate compact storage and portability.

5. The umbrella holder assembly of claim 1 wherein distal ends of the support arms and clamping arm are positionable in a plane to facilitate stable positioning of the base assembly directly on a planar ground surface.

6. The umbrella holder assembly of claim 1 wherein the holding assembly comprises:
   a first post and a second post, wherein the first post is coupled to the base assembly and the second post is pivotally coupled to the first post;
   a base support and at least one loop are coupled to the second post such that an umbrella pole is insertable through the loop and supported by the base support such that the umbrella pole is positioned to extend parallel to the second post.

7. The umbrella holder assembly of claim 6, further comprising:
   a sliding collar assembly extending from the second post and engages the first post to allow the second post to be tilted relative to the first post by sliding a collar portion on the first post; and
   wherein the collar portion frictionally engages the first post for holding the first and second posts in a static position relative to each other until sufficient force is applied to move the collar portion on the first post.

8. The umbrella holder assembly of claim 6 wherein the base support is formed by a connection band coupled to the second post and a holding cup having a lip that is supported by the connection band when the holding cup is inserted through the connection band.

9. The umbrella holder assembly of claim 6, further comprising:
   a position adjustment piece pivotally coupled to the support arms and the clamping arm; and
   the first post of the base assembly being inserted into the position adjustment piece.

10. The umbrella holder assembly of claim 8, further comprising:
    a plurality of variously sized holding cups; and
    thumb screws for coupling the holding cups to the connection band.

11. The umbrella holder assembly of claim 8, further comprising:
    a holding tube anchorable in the holding cup such that the holding tube is inserted into a tubular umbrella post when the tubular umbrella post is inserted into the holding cup.

12. The umbrella holder assembly of claim 8 wherein the holding cup is generally tubular and inserted directly into the position adjustment piece.

13. The umbrella holder assembly of claim 8 wherein the holding cup includes a telescopic neck portion secured by locking pins.

14. The umbrella holder assembly of claim 1, further comprising:
    hooks extending from the clamping arm to facilitate stable positioning and clamping of the clamping arm.

15. The umbrella holder assembly of claim 1, further comprising:
    a movable support arm pad assembly positionable along a length of a selectable one of the support arms to facilitate clamping using the support arm.

16. The umbrella holder assembly of claim 1, further comprising:
    a clamping arm pad positionable along the clamping arm to facilitate clamping and prevent damage by the clamping arm.

17. The umbrella holder assembly of claim 8, further comprising:
    a butterfly clip couplable to the umbrella pole between the holding cup and the loop, the butterfly clip being positionable adjacent to the loop whereby the umbrella pole is inhibited from being removed from the holding cup.

18. The umbrella holder assembly of claim 7, further comprising:
    an adjustment knob operationally coupled to the collar portion for selectively tightening the collar portion on the first post to inhibit sliding of the collar portion on the first post.

19. The umbrella holder assembly of claim 1, further comprising:
    a plate coupled to a pivot point of the support arms and clamping arm, the plate having a plurality of apertures; and
    a catch pin insertable through a selectable one of the apertures in the plate such that the catch pin restricts movement of the support arms and clamping arm.

20. The umbrella holder assembly of claim 1, further comprising:
    a pivoting weight arm coupled to the base assembly; and
    a weight member selectively couplable to the weight arm for inhibiting tipping of the base assembly during use.

* * * * *